(No Model.)
J. R. PHELPS.
MACHINE FOR MIXING AND KNEADING DOUGH.
No. 551,447. Patented Dec. 17, 1895.
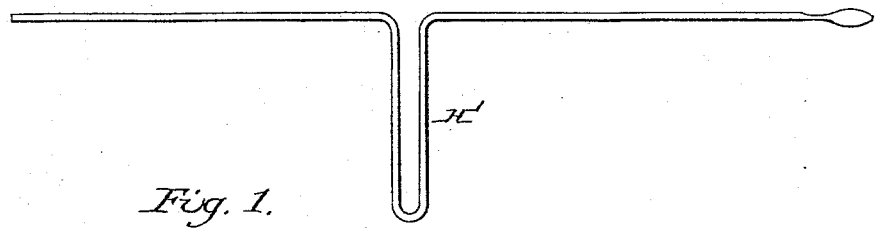
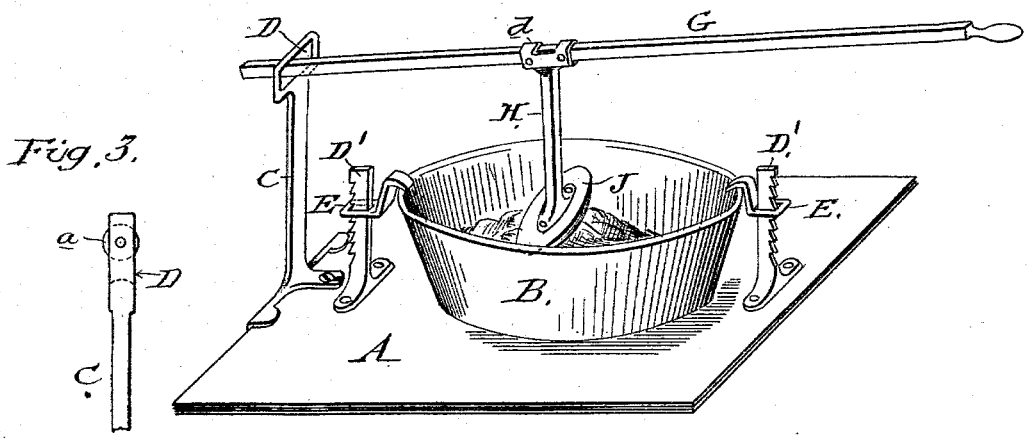
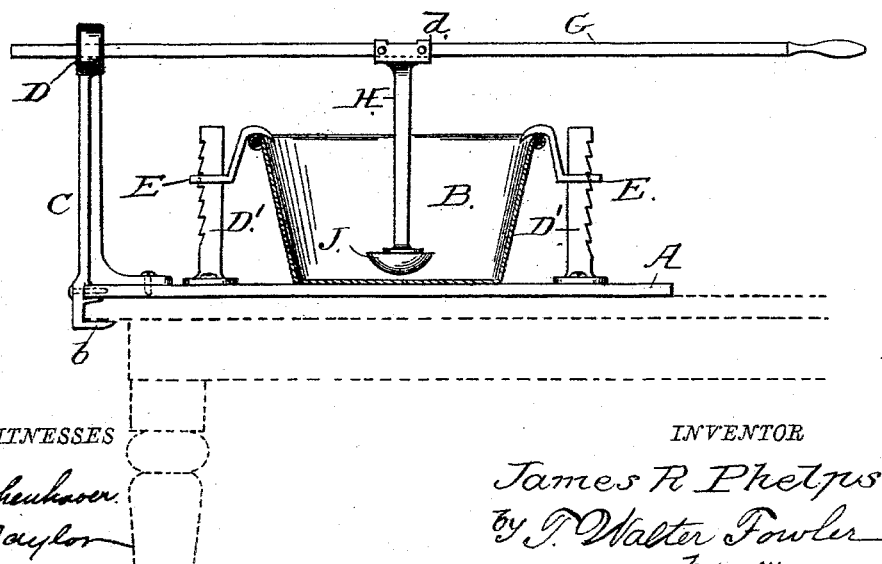
WITNESSES
J. M. Copenhaver
D. H. Naylor
INVENTOR
James R. Phelps
by T. Walter Fowler
his Attorney
ANDREW B. GRAHAM. PHOTO-LITHO. WASHINGTON, D.C.

UNITED STATES PATENT OFFICE.

JAMES R. PHELPS, OF MARYSVILLE, CALIFORNIA.

MACHINE FOR MIXING AND KNEADING DOUGH.

SPECIFICATION forming part of Letters Patent No. 551,447, dated December 17, 1895.

Application filed December 14, 1894. Renewed October 28, 1895. Serial No. 567,164. (No model.)

*To all whom it may concern:*

Be it known that I, JAMES R. PHELPS, a citizen of the United States, residing at Marysville, in the county of Yuba and State of California, have invented certain new and useful Improvements in Machines for Mixing and Kneading Dough; and I do hereby declare the following to be a full, clear, and exact description of the invention, such as will enable others skilled in the art to which it appertains to make and use the same.

My invention relates to the class of machines for mixing and kneading of dough for the making of bread and analogous articles; and my invention consists of the parts and construction and combination of parts, which I shall hereinafter fully describe and claim.

In the accompanying drawings, in which similar letters of reference indicate corresponding parts, Figure 1 represents a perspective view of a bread mixing and kneading machine embodying my invention. Fig. 2 is a side view of the same, showing the pan in section. Fig. 3 is a detail to be referred to. Fig. 4 is a modification to be referred to.

In the ordinary manipulation of dough for the making of bread, it has been customary for the housekeeper or domestic or other operator to introduce the hands directly into the mixture and squeeze the fluids and flour between the fingers, and otherwise manipulate the glutinous mass to cause a thorough intermingling of the particles, after which the dough is usually removed from the mixing-pan and worked and rolled on a table, board or some other appropriate or suitable surface. During this working and rolling dry flour is added from time to time and worked into the mass, the operator exhausting great physical strength to thoroughly knead the mass to best adapt it for the baking process. During this common method of preparing the dough it is necessary for the operator to introduce the hands into the mass at two different intervals and to clean the table or board upon which the kneading has been accomplished. This requires labor and the expenditure of time; and the direct contact of the hands with the dough is objectionable from a sanitary standpoint, as the operator's hands may not be in the best physical condition, while waste materials of the body are constantly exuding through the pores, and often disease germs, which, with small particles of external impurities lodged in pore-openings, wrinkles and beneath the finger-nails, will find their way into the mass of dough no matter what precautions as to personal cleanliness are taken.

It being generally conceded that the quality of bread depends largely upon the thorough manner in which the dough is worked by kneading prior to the baking process, and that the operation of kneading dough of a stiff nature requires the exercise of considerable strength, the process of making bread has rendered it extremely difficult for frail women to supply their tables with wholesome and light bread of their own making.

My invention has for its object the production of a simple and easily-operated machine which can be operated with the expenditure of but little strength, and which will mix the leaven and thoroughly knead the dough all in the same pan and without requiring the contact of the hands with the dough at any time during the operation.

Referring now to the drawings for a more complete explanation of my invention, A represents a board or base, which may also indicate the top of a table or any suitable surface upon which mixing-pan B may be placed. In the present case the board or base is shown as being separate from any fixed article of furniture, and has secured to it at one end a standard C, the upper end of which has an opening D made through it, which opening may be provided with an antifriction-roller a, as shown in Fig. 3. The lower portion of the standard is flanged to embrace the edge of the board, while from below is an extension with inwardly-extending claw b, which extends parallel with the board, but is below the plane of the lower surface of the same to provide a space adapted to receive the edge of the top of a table or other article whereby the board or base is prevented from tilting upwardly during the operations of the lever. While this construction is desirable for the form of apparatus shown, I do not limit myself to the same, as the standard C may be otherwise disposed and secured, it being only essential that it be firmly supported and that its upper portion shall have a fulcrum, here shown in the form of a hole or opening, for the operating-lever. The board or base A has also secured to it the uprights or posts D', one of whose edges is notched or formed with ratchet-teeth, and upon these uprights or posts the clamping-levers E are loosely fitted. These levers have one end slotted or provided with an opening whereby they may be fitted over the upper ends of the uprights or posts, and one of the walls of the openings is formed as a pawl to engage the teeth or ratchets of the uprights or posts whereby the levers E may be adjusted to different heights on the uprights or posts to correspond with the height of the mixing-pan, over the top edge of which the hook-shaped outer or free ends of the levers E are fitted, as shown in Fig. 2, whereby the pan is securely held against movement while the pan is in operative position.

The operating-lever G may be in the form of either a bar or rod. In the present case it is shown as a bar. It carries at some point between its ends, preferably at or about its middle portion, a right-angled extension H, which is of sufficient length to reach to the bottom of the mixing-pan. This extension may be of any suitable form and construction and should be of sufficient strength to resist the force applied to the lever and the resistance of the dough. In some cases the lever may be a bar or rod bent to form the integral extension H', as shown in Fig. 4, or the extension may otherwise be formed without departing from the spirit of my invention. The construction shown in the present drawings is a preferred one, and in this case the extension has a socket or recessed head $d$ through which the lever passes and to which it is secured, as by screws or bolts. The lower portion of the extension is shown flanged and has fitted to it a transversely-extending kneading-foot J, whose working-face is preferably curved or rounded, as shown.

In the operation of my apparatus the pan is secured in position by means of the clamping-levers, and the flour and leaven and requisite amount of water, milk or other liquid is added. The lever G is then placed in operative position by passing one of its ends through the opening in the standard and pushing the lever through the same until the kneader-foot or working end of the extension is about central of the pan. The walls of the opening in the standard serve as a fixed fulcrum for the lever, which latter is worked up and down by the operator so as to cause the kneader-foot to thoroughly work the dough, the lever working freely through the standard C so that it may be moved lineally to cause the kneader-foot to operate upon all parts of the dough, the roller in the opening of the standard in Fig. 3 serving to reduce the friction of the lever while being so operated.

Owing to the length of the lever the operator can readily force the kneader down into the mass to compress and work the dough to the most desirable consistency for baking, while the time consumed to complete the kneading will be much less than is required by the common hand process, and the dough is maintained in the cleanest possible condition.

Having thus described my invention, what I claim as new, and desire to secure by Letters Patent, is—

1. In a dough mixer and kneader, the combination, of a board or base adapted to receive the mixing pan, a vertical standard secured to one end of the board and having an inwardly projecting claw adapted to clamp or engage the edge of a table or support whereby the board or base is prevented from tilting upward, said standard having an elongated opening made transversely through its upper end, a lever having one end fulcrumed in said opening so that it may be moved lineally and in vertical planes, a right-angled extension from the middle portion of the lever having a socketed head through which the lever passes, and in which it is secured, a kneading foot secured to the lower end of the extension, uprights or posts on the board between which the mixing pan is placed and loosely placed clamping levers adjustably secured on said uprights and adapted to engage the rim of the pan.

2. An improved dough mixer and kneader, consisting of a base or board from one end of which rises a standard having an opening in its upper end, and having its lower end adapted to engage the edge of a table or support to prevent the board tilting upwardly, a roller mounted in said opening, uprights or posts also projecting from said board or base and having one of their edges formed with ratchets, clamping levers slotted at their lower portions so that they may be loosely fitted over said posts whereby one of the walls of each slot or opening may engage and serve as a pawl for the ratchet surfaces thereof, said levers having their upper ends formed into hooks adapted to engage the rim of the pan, and a main operating lever fulcrumed in the said standard and having a right-angled extension provided with a kneader foot adapted to enter and operate within the mixing pan.

In testimony whereof I affix my signature in presence of two witnesses.

JAMES R. PHELPS.

Witnesses:
G. B. BARNES,
B. S. BARNES.